Figure 1:
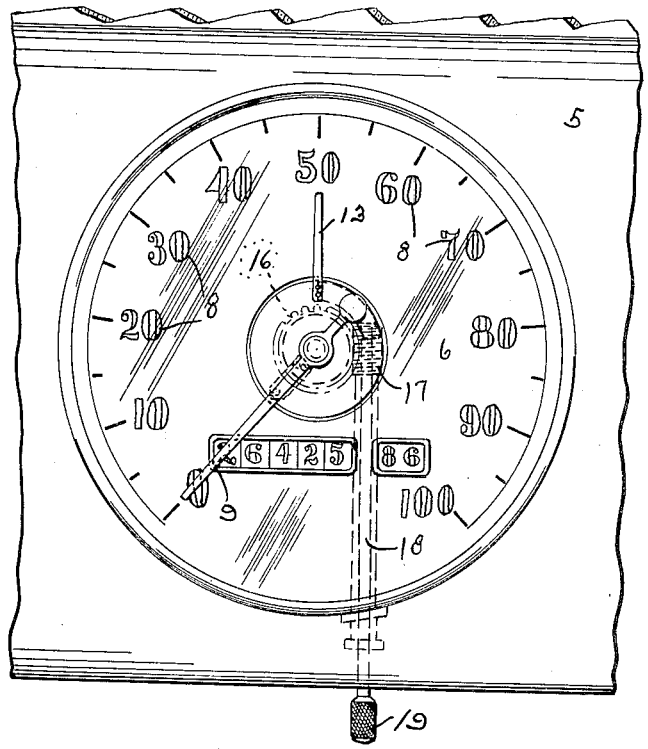

June 17, 1941.    R. R. JACKSON    2,246,047
SIGNAL SWITCH FOR SPEEDOMETERS
Filed Feb. 2, 1937

INVENTOR.
BY Richard R. Jackson,
J. J. Dowling
ATTORNEYS.

Patented June 17, 1941

2,246,047

UNITED STATES PATENT OFFICE 2,246,047

SIGNAL SWITCH FOR SPEEDOMETERS

Richard R. Jackson, Baltimore, Md.

Application February 2, 1937, Serial No. 123,594

1 Claim. (Cl. 200—56)

This invention relates to new and useful improvements in a signal alarm for speed indicating devices wherein a positive signal or alarm will be given at a fixed, predetermined speed.

A further object of the invention is the provision of a signal alarm adapted to be associated with and attached to various types of speedometers in such a way that an alarm or signal will be given when said speedometer registers beyond a given point.

A still further object of the invention is the provision of a signal alarm adapted to be so associated with a speedometer and provided with such structure, that at an excessive speed a signal or alarm will be instantly given to indicate that the travel of the device to which it is attached is in excess of the fixed speed.

In the present type of speedometer particularly adapted for motor vehicles, there is no provision made to give an alarm or signal when said vehicle is traveling beyond its legal speed, and it is the aim of the present invention to provide a means which is positive in action and that will instantly indicate when the speed of the vehicle is traveling beyond the speed legally allowed, and it is accomplished by providing on the shaft of the speed indicator contact plates which may be fixed at a given number of miles on the indicator and when the indicating hand reaches the point fixed by the contact plates an alarm or signal will be given to indicate that the vehicle is traveling beyond the legal speed.

A further object of the invention is the provision of a signal alarm which can be wholly fixed within the confines of the speedometer and permanently set at a given figure so that the device cannot be tampered with or moved, therefore assuring a positive signal or alarm when the vehicle carrying the speedometer travels beyond a fixed speed.

A still further object of the invention is the provision of a device that is simple to manufacture, easy to construct, and positive in operation, and also one which will definitely determine and indicate when a vehicle is traveling beyond a given speed.

With these and other objects in view, the invention consists in certain novel features, combination and arrangement of parts as will be hereinafter more fully described, pointed out in the accompanying drawing, and claimed.

In the drawing—

Figure 2:
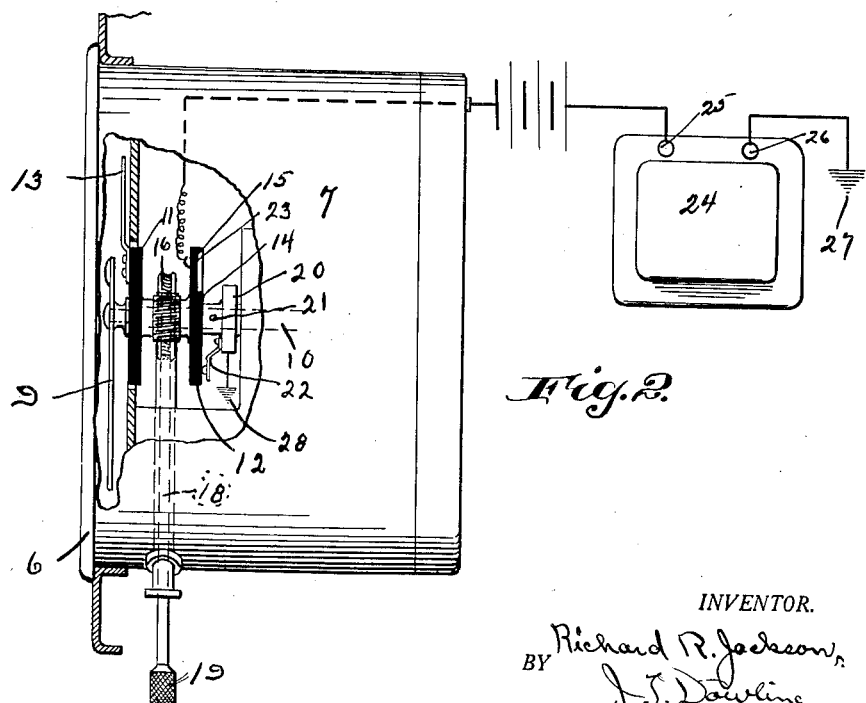

Figure 1 is an enlarged, front elevational view, illustrating a speedometer equipped with my improved signal alarm; and, Figure 2 is a side elevational view, partly broken away and in section, illustrating the method of affixing the structure to a speedometer in full assembly.

Referring to the drawing, the numeral 5 indicates a fragmentary portion of a supporting element, such as a dashboard or the like, and has arranged therein a dial 6 of a speedometer structure 7. The dial is provided with the usual mile indicating numerals 8 and has an indicating hand 9 carried by the usual shaft 10 therein. The structure just described is the usual construction of a speedometer, but it is to be understood that the invention is applicable to any type of speedometer or speed indicating device, it only being necessary to vary the structure to the hereinafter described indicating device to which it is attached.

My invention consists in its construction of a pair of relatively spaced, circular discs 11 and 12, respectively, the disc 11 to be known as the front disc and has extending laterally therefrom an indicator arm 13, the purpose of which will be hereinafter more fully described. The discs are carried by a sleeve 14, said discs and sleeve being loosely mounted on the shaft 10, as illustrated in Figure 2.

The disc 12 will be hereinafter known as the rear disc, and is provided on one face with a contact plate 15, which extends around its surface for approximately one-fourth of its circumference, it being understood, however, that the size of this plate is optional and can be increased or decreased, the purpose of which will be hereinafter more fully described.

The disc and sleeve just described, provide means wherein the limit of speed of a vehicle or other device may be determined by setting the indicating arm 13 at a fixed numeral on the dial 6 of the speedometer 7, and to provide means wherein said disc may be adjusted for various speeds. The sleeve 14 is provided with a gear wheel 16, which is in turn meshed with a worm 17 carried on a shaft 18 which extends beyond the dial 6 and is provided with a manipulating handle 19. This particular structure is optional and can be either confined wholly within the speedometer structure 7 so as not to be tampered with or any adjustments made to the indicating hand 13 after once set.

It is to be understood, however, that to reset the device or make any adjustments thereto, it is necessary to remove the entire speedometer structure from its support 5.

A boss 20 is keyed, as at 21, to the shaft 10 and has engagement with the rear disc 12. This boss 20 is provided with a contact point 22, which normally engages the face of the rear disc 12 at all times so as to take up any loose play or vibration incident to the turning of the shaft 10.

An electrical circuit is provided and has one terminal secured, as at 23, to the disc 12, and extends upwardly and through and to an alarm 24, as at 25. The circuit is further traced from the alarm and its point of connection at 26, to and through an electrical source 27 and is grounded as at 28, from the boss 20.

It will be obvious that in the operation of the device it is only necessary to set the indicating hand 13 by virtue of the shaft 18, worm 17, gear 16, which turns the disc and by the turning of the disc fixes the indicating hand 13 in alignment with the numeral on the dial 6 of the speedometer. Thus, when the hand 9 of the speedometer coincides with the hand 13, the contact 22 moves into engagement on the plate 15 of the rear disc 12 and immediately sounds the alarm or gives the signal through the device 24.

It is to be understood that the signal 24 may be in the form of a colored light, or a horn or siren, or any type of indicating alarm device wherein, when the vehicle is traveling beyond a fixed, predetermined speed, it will be instantaneously registered through the signal alarm 24.

This invention can be varied in many of its details, the primary structure being setup to involve a means wherein at a predetermined fixed speed the alarm is silent, but beyond that fixed speed the alarm or signal is instantly given.

While the preferred embodiment of the present invention is discolsed in the figures, it is to be understood that certain minor changes may be made without departing from the spirit and scope of the invention as claimed.

Having thus described my invention, what I claim as new is:

A speedometer switch of the class described, comprising a pair of spaced discs, a sleeve secured to said discs, said sleeve and discs mounted on a speedometer shaft, an indicating arm carried by one of the discs, a contact plate on the other of said discs, a boss keyed to the shaft, a contact point on said boss and normally engaging the plate of the last named disc, means for controlling the disc for movement into various fixed positions, an indicating hand carried by the speedometer shaft whereby upon the aligning of the hand and arm the switch will be closed for the purpose specified.

RICHARD R. JACKSON.